United States Patent [19]
Vanderhider et al.

[11] Patent Number: 4,495,081
[45] Date of Patent: Jan. 22, 1985

[54] COMPOSITIONS CONTAINING POLYETHER POLYOLS AND ALIPHATIC PRIMARY AMINES

[75] Inventors: James A. Vanderhider, Lake Jackson; Gerald M. Lancaster, Surfside, both of Tex.

[73] Assignee: The Dow Chemical Company, Midland, Mich.

[21] Appl. No.: 549,697

[22] Filed: Nov. 7, 1983

Related U.S. Application Data

[63] Continuation-in-part of Ser. No. 397,714, Jul. 13, 1982, abandoned, which is a continuation-in-part of Ser. No. 321,348, Nov. 16, 1981, abandoned, which is a continuation-in-part of Ser. No. 231,066, Feb. 3, 1981, abandoned.

[51] Int. Cl.$^3$ .................. C08G 18/06; C08G 18/14; C09K 3/00
[52] U.S. Cl. .................. 252/182; 521/159; 521/163; 528/68
[58] Field of Search .................. 528/85, 68; 252/182; 521/163, 159

[56] References Cited

U.S. PATENT DOCUMENTS 3,179,606  4/1965  Prescott et al. .
3,267,050  8/1966  Kuryla et al. .
4,107,106  8/1978  Dunleavy et al. .
4,133,943  1/1979  Blahak et al. .
4,246,363  1/1981  Turner et al. .
4,269,945  5/1981  Vanderhider et al. .............. 521/159

FOREIGN PATENT DOCUMENTS 863223  2/1971  Canada .
1534253  11/1978  United Kingdom .

OTHER PUBLICATIONS

Ludwico et al., Bayflex 110 Series, The New Generation of RIM Materials, 9/26–30/77.
Gerkin et al., The Properties of High Modulus RIM Urethanes, 9/26–30/77.
Bonart, J. Macromol. Sci., 3/78, 115–138.
Wilkes et al., J. Macromol. Sci., 1977, pp. 157–175.
Wischmann et al., Journal of Electronics and Plastics, vol. 9, 7/77, pp. 299–311.
Rowton, Journal of Electronics and Plastics, vol. 9, 10/77, pp. 365–375.

*Primary Examiner*—Allan M. Lieberman
*Attorney, Agent, or Firm*—James G. Carter

[57] ABSTRACT

A composition consisting essentially of (I) at least one polyol having an average of more than 2 hydroxyl groups per molecule and an average hydroxyl equivalent weight of at least about 500 and (II) as a chain extender composition (A) an aliphatic amine-containing material having at least one primary aliphatic amine group per molecule and (B) at least one material selected from (1) hydroxyl-containing materials, or (2) aromatic amine-containing materials.

These compounds are useful in preparing polyurethane articles employing reaction injection molding technology.

11 Claims, No Drawings

4,495,081

COMPOSITIONS CONTAINING POLYETHER POLYOLS AND ALIPHATIC PRIMARY AMINES

CROSS REFERENCE TO RELATED APPLICATION

This is a continuation-in-part of application Ser. No. 397,714 filed July 13, 1982 (now abandoned) which is a continuation-in-part of application Ser. No. 321,348 filed Nov. 16, 1981 (now abandoned) which is a continuation-in-part of application Ser. No. 231,066 filed Feb. 3, 1981 (now abandoned).

BACKGROUND OF THE INVENTION

Reaction injection molded polyurethanes are well known in the art as described in a paper entitled "THE BAYFLEX 110 SERIES-THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Mich., Sept. 26–30, 1977; a paper entitled "THE PROPERTIES OF HIGH MODULUS RIM URETHANES", by R. M. Gerkin and F. E. Critchfield presented at the above meeting; British Pat. No. 1,534,258 titled "PROCESS FOR THE PRODUCTION OF ELASTOMERIC POLYURETHANE-POLYUREA MOULDED PRODUCTS HAVING A COMPACT SURFACE SKIN" and a book by F. Melvin Sweeny entitled INTRODUCTION TO REACTION INJECTION MOLDING, Technomics, Inc., 1979.

These systems employ, as chain extenders, diols, aromatic amines, cyanoethylated polyoxyalkylene amines and mixtures thereof.

It has been thought that as a general rule the aliphatic amines are too fast to be suitably employed in RIM urethane applications. We previously disclosed in our allowed copending application Ser. No. 114,803, filed Jan. 24, 1980, now U.S. Pat. No. 4,269,945 issued May 26, 1981, entitled "REACTION INJECTION MOLDED POLYURETHANES EMPLOYING ALIPHATIC AMINE CHAIN EXTENDERS" that certain quantities of aliphatic amines enhance certain properties such as one or more of those selected from, for example, flexural modulus, impact strength, tear strength, heat resistance and the like can be improved by their use in such RIM urethane systems usually without an unacceptable reduction in other properties of the polymer.

Since the properties of the resultant polyurethanes can be varied depending upon the ratio of primary aliphatic amine containing material to low molecular weight hydroxyl containing material and/or aromatic amine-containing material, the composition provides a means for varying the properties without having a multiplicity of compositions i.e., by having a composition which can be employed to prepare polyurethanes of varying properties by blending therewith the desired quantity of low molecular weight hydroxyl-containing material and/or aromatic amine-containing material and optionally additional quantities of relatively high molecular weight polyol and thereafter reacting such blend or as separate streams with a polyisocyanate and other optional components if desired.

SUMMARY OF THE INVENTION

The present invention concerns a composition of matter consisting essentially of a mixture of
(I) a polyol or a mixture of polyols which polyol or mixture of polyols has an average hydroxyl functionality of at least 2, suitably from about 3 to about 8 and most suitably from about 3 to about 4 and an average hydroxyl equivalent weight of at least about 500, suitably from about 1000 to about 5000, most suitably from about 1000 to about 3000;
(II) as a chain extender composition,
 (A) at least one aliphatic amine-containing material having at least one primary amine group or a mixture of such materials, which material or mixture of materials has an average aliphatic amine hydrogen functionality of from about 2 to about 16, preferably from about 2 to about 12 and most preferably from about 4 to about 8 and an average aliphatic amine hydrogen equivalent weight of from about 15 to about 500, preferably from about 50 to about 200 and most preferably from about 80 to about 150; and
 (B) one or more of the members selected from the group consisting of
  (1) a hydroxyl-containing material free of aliphatic amine hydrogen atoms or mixture of such materials, which material or material mixture has an average OH functionality of from about 2 to about 4, preferably from about 2 to about 3, and most preferably about 2; and an average OH equivalent weight of from about 30 to about 120, preferably from about 30 to about 70, and most preferably from about 30 to about 50; and
  (2) an aromatic amine-containing compound which is essentially free of aliphatic amine hydrogens and which contains at least 2 aromatic amine hydrogen atoms or a mixture of such materials; and wherein
 (i) components (I) and (II-A) are present in quantities which provide from about 60 to about 98, suitably from about 80 to about 96, most suitably from about 90 to about 95 percent by weight of polyether polyol based upon the combined weights of said polyether polyol and said aliphatic amine-containing material and
 (ii) component (II-B) is present in a quantity up to about 60, preferably from about 5 to about 50, and most preferably from about 10 to about 35 percent by weight of the combined quantities of (I), (II-A) and (II-B).

The above composition is useful in preparing polyurethane articles by reaction injection molding technology by reacting with a polyisocyanate or blending or feeding as a separate stream additional quantities of a suitable low molecular weight hydroxyl-containing material and/or an aromatic amine and then reacting with a polyisocyanate. Optionally, additional quantities of polyether polyol can be employed to meet the desired ratio of polyether polyol, aliphatic amine and low molecular weight polyol and/or aromatic amine. Such utility is fully described in our copending allowed application Ser. No. 114,803, filed Jan. 24, 1980, now U.S. Pat. No. 4,269,945 issued May 26, 1981 entitled "REACTION INJECTION MOLDED POLYURETHANES EMPLOYING ALIPHATIC AMINE CHAIN EXTENDERS" the entire contents of which is incorporated herein by reference. Also incorporated herein by reference are the following papers and/or articles. Paper entitled "THE BAY FLEX 110 SERIES—THE NEW GENERATION OF RIM MATERIALS", by W. A. Ludwico and R. P. Taylor presented at the SOCIETY OF AUTOMOTIVE ENGINEERS PASSENGER CAR MEETING, Detroit, Mich., Sept. 26–30, 1977, discloses reaction injection molded polyurethanes. Paper entitled "THE PROPERTIES OF HIGH MOLDULUS RIM URETHANES", by R. M. Gerkin and F. E. Critchfield presented at the above meeting discloses reaction injection molded polyurethanes.

DETAILED DESCRIPTION OF THE INVENTION

The relatively high molecular weight hydroxyl-containing polyols which can be employed herein are those polyether and polyester polyols which are free of active amine hydrogen atoms and which have an average hydroxyl functionality of at least 2, suitably from about 2 to about 8, preferably from about 2 to about 4, and most preferably from about 2 to about 3; and an average hydroxyl equivalent weight of from about 500 to about 5000, preferably from about 1000 to about 3000, and most preferably from about 1500 to about 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(methylamino)-diphenylmethane, 1-methyl-2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g. with halogen atom) and/or unsaturated. Examples of carboxylic acids of this kind include succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids; such as oleic acid, which may be in admixture with monomeric fatty acids, terephthalic acid dimethyl ester; terephthalic acid bis-glycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxymethyl cyclohexane) 2-methyl-1,3-propane diol; glycerol; trimethylol propane; 1,2,6-hexane triol; 1,2,4-butane triol; trimethylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other polyols which can be employed herein include polymer-containing polyols such as, for example, those disclosed in U.S. Pat. Nos. RE 29,118 (Stamberger), RE 28,715 (Stamberger), RE 29,014 (Pizzini et al) and 3,869,413 (Blankenship et al) all of which are incorporated herein by reference.

Suitable hydroxyl-containing materials which are free of aliphatic amine hydrogen atoms which can be employed herein include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

The classical function, utility and definition of chain extenders in polyurethanes are suitably described in U.S. Pat. No. 3,233,025, col. 4, lines 5–28; U.S. Pat. No. 3,915,937, col. 1, lines 20–27 and 36–44; U.S. Pat. No. 4,065,410, col. 1, lines 42–44, col. 2, lines 20–21 and col. 4, line 60 to col. 5, line 41; U.S. Pat. No. 4,048,105, col. 1, lines 30–38 and col. 2, lines 4–13. All of the above are incorporated herein by reference.

Suitable aliphatic amine-containing materials having at least one primary amine group which can be employed as a chain extender herein include, for example, alkylene diamines, polyalkylene polyamines, cycloaliphatic amines, heterocyclic aliphatic amines, aminated polyoxyalkylene compounds, mixtures thereof and the like.

Suitable such aliphatic amine-containing materials having at least one primary amine group which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis(p-aminocyclohexyl)methane, triethylenetetramine, tetraethylenepentamine, mixtures thereof and the like.

Suitable such aminated polyoxyalkylene compounds which can be employed herein as the aliphatic amine are those represented by the formula

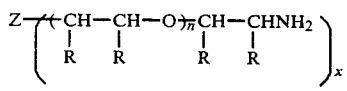

wherein Z is the residue resulting from the removal of two or more hydrogen atoms from an initiator compound having a plurality of OH, NH or $NH_2$ groups or a combination of such groups; x has a value of from 2 to about 16, preferably 2 to about 8, and most preferably from 2 to about 4; n has a value sufficient to provide the compound with the desired equivalent weight; and each R is independently hydrogen or a hydrocarbyl group having from 1 to about 4 carbon atoms with the proviso that when one of the R groups is other than hydrogen or a methyl group, the other R group is hydrogen.

Suitable such initiator compounds include those aforementioned initiator compounds suitable in the preparation of the relatively high molecular weight hydroxyl-containing compounds.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which are essentially free of aliphatic amine hydrogen atoms which can be employed herein include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4"triamine, 4,4'-di-(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethany, 4,4'-methylene-bis(2,6-diisopropylaniline), polymethylene polyphenylamines, 2,4-bis(p-aminobenzyl)aniline, mixtures thereof and the like.

Suitable polyisocyanates include the organic aromatic and aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanate, mixtures thereof and the like.

Also suitable are organic aromatic polyisocyanates and the prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, mixtures thereof and the like.

Also suitable are the corresponding polyisothiocyanates.

The polyurethanes can be prepared either in the presence or absence of a catalyst. Those polyurethanes prepared from amine containing polyols do not usually require a catalyst although catalysts can be employed if desired. On the other hand, those polyurethanes prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadryl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis (2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part 100 parts of total polyol employed depending upon the activity of the catalyst. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No. 4,126,741 (Carleton et al) all of which are incorporated herein by reference.

The zwitterions can also function as a catalyst for urethane formation i.e. the NCX-OH reaction.

If desired, the densities of the polyurethanes produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from Union Carbide Corp.; and B-1048 commercially available from PH. Goldschmidt, AG., mixtures thereof and the like.

The polyurethanes prepared herein may additionally contain, if desired, coloring agents, mold release agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) and ¼ inch (0.64 cm) and the like. Other particularly suitable fillers are mica, wollastonite, and the like.

The components which react to form the polyurethanes can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

Particularly suitable injection methods for the RIM applications of the present invention include those disclosed in the aforementioned articles by Ludwico et al, Gerkin et al, British Pat. No. 1,534,258 and the book by F. Melvin Sweeney all of which are incorporated herein by reference.

To prevent the solidifying mass from adhering to the mold surface, it may be necessary to precoat the mold surface with a film of a suitable mold release agent such as, for example, hydrocarbon wax or a polysiloxane preparation or a polytetrafluoroethylene coating, or employ an internal mold release agent in the composition.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The following examples are illustrative of the present invention and are not to be construed as to limiting the scope thereof in any manner.

The following components were employed in the examples.

POLYOL A is a glycerine initiated polyoxypropylene glycol end-capped with ethylene oxide having an average OH equivalent weight of about 1650 and containing about 18% ethylene oxide by weight.

ALIPHATIC AMINE A is an aminated polyoxypropylene glycol represented by the formula

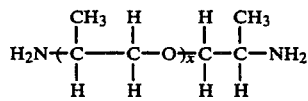

wherein x has a value of about 5.6. The product has an average amine hydrogen equivalent weight of about 100 and is commercially available from Jefferson Chemical Co. and JEFFAMINE D-400.

POLYOL-ALIPHATIC AMINE MIXTURE A is a mixture of 93 parts by weight of polyol A and 7 parts by weight of Aliphatic Amine A.

POLYISOCYANATE A is a liquid, modified diphenylmethane diisocyanate containing a high percentage of pure diphenylmethane diisocyanate and a lesser amount of polycarbodiimide adducts commercially available from The Upjohn Company as ISONATE 143L. The average NCO equivalent weight is about 143.

CATALYST A is FORMREZ UL-28 commercially available from Witco Chemical Co.

CATALYST B is T-12 commercially available from M & T Chemicals, Inc.

EXAMPLES 1-5

A mixture of a polyol and an aliphatic amine-containing material of the present invention was employed to prepare polyurethane articles employing various amounts of ethylene glycol by use of high pressure impingement mixing equipment employing one of the following type units: Admiral HP-40, Hennecke HK 245 or Krauss Maffei PU 80/40. Samples were molded in a heated polished steel mold forming a ⅛" thick sheet of polymer, demolded 60 sec. after injection. The polyol components were maintained at a temperature of 75°–140° F. (23.89°–60° C.). The isocyanate components were maintained at a temperature of from 75°–120° F. (23.89°–48.89° C.). The components were injected into the mold at a pressure of 1500–2500 psi (105.45–175.75 kg/cm₂). The injection rates varied from 25 lbs/min (11.34 kg/min) to 220 lbs/min (99.79 kg/min). The mold temperatures varied from 125°–175° F. (51.67°–79.44° C.).

The components and physical properties are given in the following Table. The physical properties were obtained after the samples had been post cured at 250° F. (121.11° C.) for 60 minutes.

TABLE

| COMPONENT AND PROPERTY | EXAMPLE 1 | EXAMPLE 2 | EXAMPLE 3 | EXAMPLE 4 | EXAMPLE 5 |
|---|---|---|---|---|---|
| Polyol-Aliphatic Amine Mixture A, pbw | 100 | 100 | 100 | 100 | 100 |
| Ethylene Glycol, pbw | 16.7 | 22.4 | 27.9 | 37.2 | 41.9 |
| Catalyst A, pbw | 0.2334 | 0.2448 | 0.2558 | 0.2744 | 0.2838 |
| Catalyst B, pbw | 0.1167 | 0.1224 | 0.1279 | 0.1372 | 0.1419 |
| Polyisocyanate A, Index | 103 | 103 | 103 | 103 | 103 |
| Flexural Modulus, psi ($kg/cm^2$) | 31,200 (2193) | 61,200 (4302) | 122,000 (8577) | 185,000 (13006) | 103,000 (14271) |
| Tensile Strength, psi ($kg/cm^2$) | 3738(263) | 4152(292) | 4870(342) | 5314(374) | 4900(345) |
| Elongation, % | 250 | 165 | 175 | 120 | 90 |
| Tear Strength[1], pli (kg/cm) | 522(93) | 573(102) | 1000(179) | 1160(207) | 925(165) |
| Heat Sag[2] | | | | | |
| 250° F.(121° C.)/60 min, in(cm) | 0.57(1.45) | 0.39(0.99) | 0.15(0.38) | 0.11(0.28) | 0.05(0.18) |
| 325° F.(162.8° C.)/30 min, in(cm) | N.D.[3] | N.D. | 0.7(1.8) | 0.45(1.1) | 0.3(0.8) |
| Izod Impact, ft-lbs/in (J/cm) | N.D. | N.D. | 13(6.9) | 11.(5.9) | 4.7(2.5) |
| Specific gravity, g/cc | 1.05 | 1 | 1.09 | 1.12 | 1.06 |

[1] Die "C" tear strength
[2] 4 inch (10.16 cm) overhand heat sag values
[3] N.D. = not determined

We claim:

1. A composition consisting essentially of a mixture of
    (I) a polyol or a polyol mixture which polyol(s) is (are) free of active amine hydrogen atoms and which polyol or polyol mixture has an average hydroxyl functionality of at least 2 and an average hydroxyl equivalent weight of from about 500 to about 5000 and
    (II) as a chain extender composition a mixture comprising
        (A) at least one aliphatic amine-containing material having at least one primary amine group or a mixture of such materials, which material or mixture of materials has an average aliphatic amine hydrogen functionality of from about 2 to about 16 and an average aliphatic amine hydrogen equivalent weight of from about 15 to about 500 selected from the group consisting of alkylenediamines, polyalkylenepolyamines, cycloaliphatic amines, heterocyclic aliphatic amines and aminated polyoxyalkylene compounds which are represented by the general formula

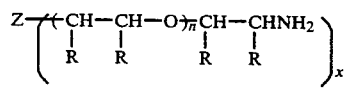

wherein Z is the residue resulting from the removal of two or more hydrogen atoms from an initiator compound having a plurality of OH, NH or NH$_2$ groups or a combination of such groups; x has a value of from 2 to about 16; n has a value sufficient to provide the compound with the desired equivalent weight; and each R is independently hydrogen or a hydrocarbyl group having from 1 to about 4 carbon atoms with the proviso that when one of the R groups is other than hydrogen or a methyl group, the other R group is hydrogen; and
        (B) one or more of the members selected from the group consisting of
            (1) at least one hydrogen-containing material free of aliphatic amine hydrogen atoms or mixture of such materials, which material or material mixture has an average OH functionality of from about 2 to about 4; and an average OH equivalent weight of from about 30 to about 120; and
            (2) at least one aromatic amine-containing compound which is essentially free of aliphatic amine hydrogens and which contains at least 2 aromatic amine hydrogen atoms or mixture of such materials; and
    wherein
    (a) components (I) and (II-A) are present in quantities such that component (I) provides from about 60 to about 98 percent by weight of the composition based upon the combined weight of components (I) and (II-A) and
    (b) component (II-B) is present in a quantity of from about 5 to about 60 percent by weight of the combined quantities of (I), (II-A) and (II-B).

2. A composition of claim 1 wherein
    (1) component (I) is a glycerine and/or a trimethylolpropane initiated polyoxyalkylenepolyol; and
    (2) component (II-A) is an aminated polyoxyalkylene compound having an average amine hydrogen equivalent weight of from about 60 to about 110 wherein Z is water, propylene glycol or dipropylene glycol, and R is hydrogen and the other R is methyl, and x is 2.

3. A composition of claim 1 wherein
    (1) component (I) is a polyether polyol or a mixture of polyether polyols, which polyol or polyol mixture has an average hydroxyl functionality of from about 2 to about 8 and an average hydroxyl equivalent weight of from about 500 to about 5000;
    (2) component (II-A) has an average aliphatic amine hydrogen functionality of from about 2 to about 12 and an average aliphatic amine hydrogen equivalent weight of from about 50 to about 200;
    (3) components (I) and (II-A) are present in quantities such that component (A) provides from about 80 to about 96 percent by weight of the composition based upon the combined weight of components (I) and (II-A); and
    (4) component (II-B-1) has an average hydroxyl functionality of from about 2 to about 3 and an average hydroxyl equivalent weight of from about 30 to about 70; and (5) component (II-B) is present in quantities of from about 5 to about 50 percent by weight of the total quantity of components (I), (II-A) and (II-B).

4. A composition of claim 3 wherein
(1) component (I) has an average functionality of from about 2 to about 4 and an average hydroxyl equivalent weight of from about 1000 to about 3000;
(2) component (II-A) has an average aliphatic amine hydrogen functionality of from about 4 to about 8 and an average aliphatic amine hydrogen equivalent weight of from about 80 to about 150;
(3) components (I) and (II-A) are present in quantities such that component (A) provides from about 90 to about 95 percent by weight of the composition based upon the combined weight of components (I) and (II-A);
(4) component (C-1) has an average funtionality of about 2 and an average hydroxyl equivalent weight of from about 30 to about 50; and
(5) component (II-B) is present in quantities of from about 10 percent to about 35 percent by weight of the combined quantities of (I), (II-A) and (II-B).

5. A composition of claim 4 wherein component I has an average hydroxyl functionality of from about 2 to about 3 and an average hydroxyl equivalent weight of from about 1500 to about 2500.

6. A composition of claims 1, 2, 3, 4 or 5 wherein
(1) component (I) is a glycerine and/or trimethylolpropane initiated polyoxyalkylenepolyol;
(2) component (II-A) is an aminated polyoxyalkylene compound having an average amine hydrogen equivalent weight of from about 60 to about 110 wherein Z is water, propylene glycol or dipropylene glycol, one R is hydrogen and the other R is methyl, and x is 2; and
(3) component (II-B) is ethylene glycol.

7. A composition of claims 1, 2, 3, 4 or 5 wherein
(1) component (I) is a glycerine and/or trimethylolpropane initiated polyoxyalkylenepolyol;
(2) component (II-A) is an aminated polyoxyalkylene compound having an average amine hydrogen equivalent weight of from about 60 to about 110 wherein Z is water, propylene glycol or dipropylene glycol, one R is hydrogen and the other R is methyl, and x is 2; and
(3) component (II-B) is a polymethylene polyphenyl amine containing major quantities of 2,4-bis(p-aminobenzyl)aniline.

8. A composition of claims 1, 2, 3, 4 or 5 which additionally contains minor quantities of one or more of any combination of cell control agents, fire retardant agents, mold release agents, blowing agents or coloring agents.

9. A composition of claim 6 which additionally contains minor quantities of one or more of any combination of cell control agents, fire retardant agents, mold release agents, blowing agents or coloring agents.

10. A composition of claim 7 which additionally contains minor quantities of one or more of any combination of cell control agents, fire retardant agents, mold release agents, blowing agents or coloring agents.

11. A composition of claim 8 which additionally contains minor quantities of one or more of any combination of cell control agents, fire retardant agents, mold release agents, blowing agents or coloring agents.

* * * * *